(12) United States Patent
Sasse et al.

(10) Patent No.: US 10,215,050 B2
(45) Date of Patent: Feb. 26, 2019

(54) APPARATUS FOR ENERGY ABSORPTION, A TURBO-MACHINE AND A METHOD FOR ENERGY ABSORPTION

(71) Applicant: MTU Aero Engines AG, Munich (DE)

(72) Inventors: Stefan Sasse, Petershausen (DE); Norbert Schinko, Munich (DE)

(73) Assignee: MTU Aero Engines AG, Munich (DE)

(*) Notice: Subject to any disclaimer, the term of this patent is extended or adjusted under 35 U.S.C. 154(b) by 602 days.

(21) Appl. No.: 14/475,238

(22) Filed: Sep. 2, 2014

(65) Prior Publication Data

US 2015/0063986 A1   Mar. 5, 2015

(30) Foreign Application Priority Data

Sep. 3, 2013   (DE) .......................... 10 2013 217 503

(51) Int. Cl.
| | |
|---|---|
| *F01D 21/04* | (2006.01) |
| *F01D 25/24* | (2006.01) |
| *F01D 17/02* | (2006.01) |
| *F02C 7/05* | (2006.01) |

(52) U.S. Cl.
CPC ........... *F01D 21/045* (2013.01); *F01D 17/02* (2013.01); *F01D 21/04* (2013.01); *F01D 25/24* (2013.01); *F02C 7/05* (2013.01); *F05D 2260/311* (2013.01); *Y02T 50/671* (2013.01)

(58) Field of Classification Search
CPC ........ F01D 21/04; F01D 21/045; F01D 17/02; F01D 25/24; F02C 7/05; F05D 2240/11; F05D 2240/14; F05D 2260/30; F05D 2260/311; F05D 2260/38; F05D 2270/09
See application file for complete search history.

(56) References Cited

U.S. PATENT DOCUMENTS

| 4,149,824 A | * | 4/1979 | Adamson | .............. F01D 21/006 |
| | | | | 415/197 |
| 5,203,673 A | * | 4/1993 | Evans | ..................... F01D 11/22 |
| | | | | 415/10 |
| 2010/0313404 A1 | | 12/2010 | Bates | |
| 2014/0286748 A1 | * | 9/2014 | Costa | ................... F01D 21/045 |
| | | | | 415/9 |

FOREIGN PATENT DOCUMENTS

| EP | 1 073 828 B1 | 2/2001 |
| EP | 1 754 861 A2 | 2/2007 |

* cited by examiner

*Primary Examiner* — Richard A Edgar
*Assistant Examiner* — Alexander A White
(74) *Attorney, Agent, or Firm* — Crowell & Moring LLP

(57) ABSTRACT

An apparatus for absorption of an impact energy from at least one blade fragment is disclosed. The impact energy acts on an element that is inserted into an opening in a turbo-machine. The opening passes radially through a housing section in a region of a row of rotating blades. The apparatus has a holder for holding the element in an ideal position and releasing the element beyond a preset maximum load and has a cage at a rear to secure the element in a radially outward-directed displacement. A turbo-machine having such an apparatus, as well as a method for multistage energy absorption, is also disclosed.

10 Claims, 1 Drawing Sheet

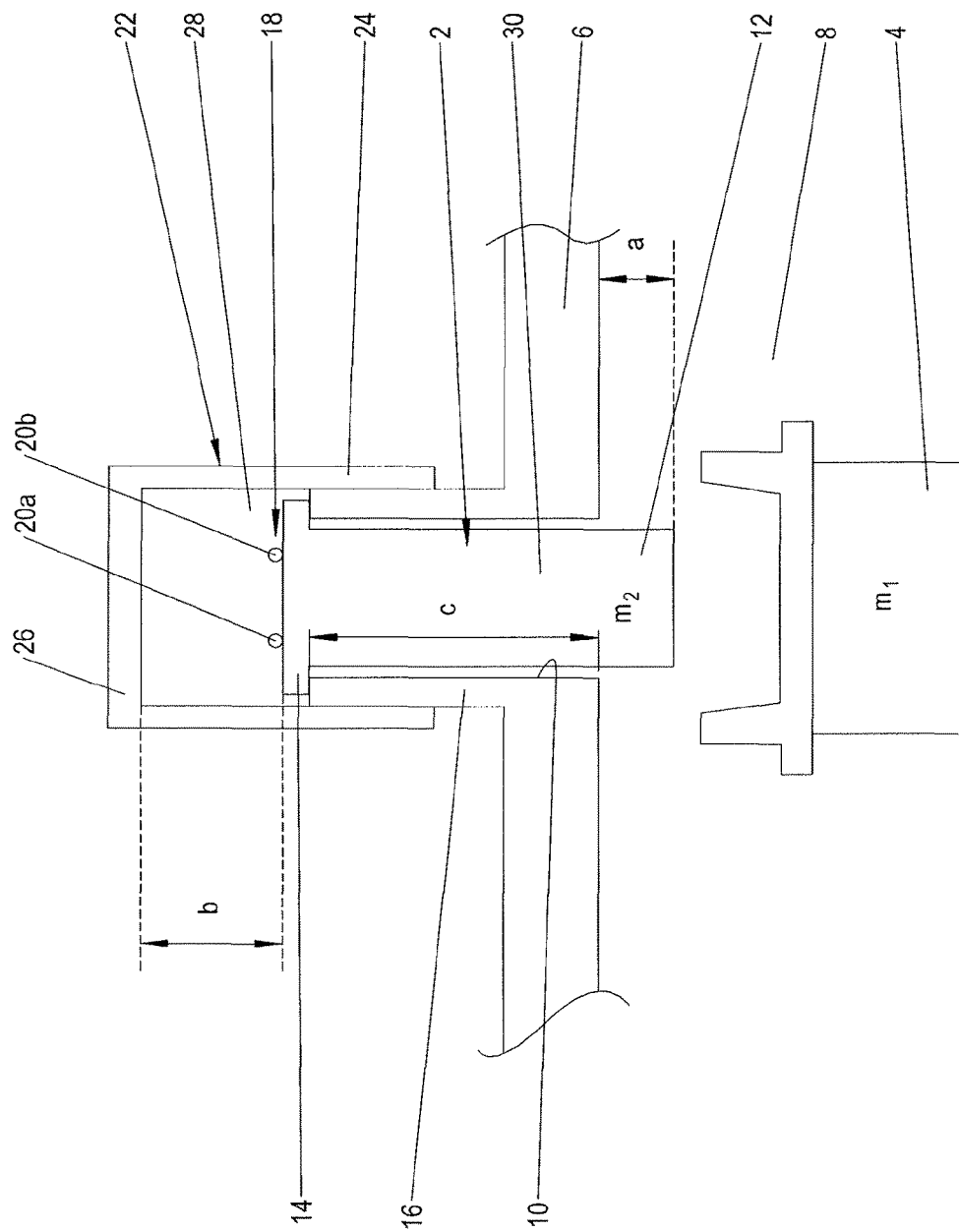

APPARATUS FOR ENERGY ABSORPTION, A TURBO-MACHINE AND A METHOD FOR ENERGY ABSORPTION

This application claims the priority of German Patent Application No. DE 102013217503.5, filed Sep. 3, 2013, the disclosure of which is expressly incorporated by reference herein.

BACKGROUND AND SUMMARY OF THE INVENTION

The invention relates to an apparatus for absorption of impact energy acting on an element from at least one blade fragment, where the element is inserted into an opening in a turbo-machine which passes radially through a housing section in the region of a row of rotor blades, a turbo-machine having such an apparatus as well as a method for absorption of an impact energy acting on an element from at least one blade fragment, where the element is inserted into an opening in a turbo-machine which passes radially through a housing section in the region of a row of blades.

Turbine housings of high-speed turbo-machines such as gas turbines and aircraft engines in particular traditionally have very thick walls to retain the blade and/or the blade fragment in the interior of the turbine after loss of a blade or loss of a blade fragment. Therefore, to prevent weakening of the turbine housing and/or to achieve so-called "containment capability" of the turbine housing, holes and/or openings in the turbine housing in the region of the rotor blades are generally avoided. However, if apparatuses for clearance maintenance and/or for measuring the clearance of a radial clearance between a row of blades and a housing section surrounding the rotor blades are provided, then openings for positioning appropriate elements such as sensors, probes and the like are unavoidable. In impact with such a rigid element, the kinetic energy of the blade and/or of the blade fragment is transferred completely to the element, which in turn delivers the energy to its attachment on the housing end. However, the high-energy density leads to an uncontrolled failure of the element mount and thus to release of the element from the housing section, which in turn results in loss of this "containment capability."

U.S. Pat. No. 5,203,673 A discloses a tip clearance apparatus for maintaining the blade tip clearance for a turbo-machine, i.e., for maintaining a radial clearance between a rotor stage of a turbo-machine with rotor blades of a row of rotor blades of the rotor stage having a conical tip and a conical housing section surrounding the row of blades. The housing section is axially displaceable so that the radial clearance may be increased or decreased by an axial displacement due to the conical design. To detect the radial clearance and to control an actuator, at least one sensor which is permanently inserted into a radial opening is provided in the housing section. At least the one sensor is flush with the housing section near the clearance.

EP 1 754 861 A2 discloses an apparatus for detecting a radial clearance between a row of rotating blades of a rotor stage and a housing section surrounding the row of blades. This apparatus has at least one sensor, which is inserted into an opening on the housing and is set back in the opening on the clearance end with respect to the housing section. The sensor is secured in an insert which is bolted to the housing section directly or indirectly.

U.S. Patent Application Publication No. 2010/0313404 A1 also describes an apparatus for maintaining a radial clearance between a row of rotating blades of a rotor stage and a housing section surrounding that row of blades. The apparatus has a pressure-based actuator by means of which the housing section can be moved inward and outward radially.

EP 1 073 828 A1 discloses an apparatus for absorption of impact energy of a rotating blade and/or a rotating blade fragment of a turbo-machine. This apparatus has a ring system surrounding the row of rotating blades and consisting of a rigid outer ring and a plastically deformable inner ring. A deformation sheet is arranged between the rings. On impact, the internal ring undergoes deformation and releases its deformation energy at least in part to the deformation sheet. The rigid outer ring holds the inner ring and the deformation sheet in position.

The object of the present invention is to create an apparatus and a method by means of which a containment capability of a housing of a turbo-machine can be preserved in the event of an impact of at least one blade fragment with an element arranged on the housing end opposite a row of rotating blades. Furthermore, the object of the present invention is to create a turbo-machine having a high containment capability.

An apparatus according to the invention for absorption of an impact energy from at least one blade fragment acting on an element includes a holder for holding the element in an ideal position and which releases the element beyond a preset maximum load and a rear cage for securing the element in the event of a displacement acting radially outward. This element is inserted into an opening in a turbo-machine, the opening passing through a housing section in the region of a row of rotating blades.

The apparatus according to the invention permits dissipation of the impact energy in the region of an opening and thus in the housing region that is critical for containment. Due to the fact that the element is installed in a cage, so that it is movable in the radial direction, any energy input to the element is reduced in combination with the holder, which opens when the maximum load is exceeded. The cage secures the element on and/or in the region of the housing section, thus fundamentally preventing the element from being released from the housing section.

The maximum load on the holder can be adjusted and/or preset accurately if the holder has at least one intended breaking point.

The cage preferably limits the displacement space which is closed off with respect to the housing environment and/or the external environment. This prevents a substream of a primary flow that is flowing through the turbo-machine from emerging into the external environment through the opening in the event of such an impact. Furthermore, this also prevents blade fragments or element fragments from emerging through the opening into the external environment.

To preset the maximum displacement distance, the cage has a rear limit to act as a stop for the element so that the energy acting on the element can be further dissipated.

A turbo-machine according to the invention has at least one apparatus according to the invention and is therefore characterized in this way by a high containment capability. The turbo-machine is preferably a gas turbine and in particular is an aircraft engine.

If the element penetrates through the opening for a section and thus protrudes radially beyond the opening with a section on the inside, it is advantageous if the element in the cage is displaceable by a radial distance which is greater than the amount by which the element protrudes radially out of the opening on the inside. This measure ensures that the element can be completely driven into the opening and/or by the impact.

To keep the element in the opening after the impact, it is advantageous if the element is accommodated in its ideal position with a section in the opening, the extent of which is greater in the axial direction than the displacement distance. Holding the element with a section in the opening results in a sealing of the displacement space, thereby preventing penetration of a substream of the primary flow even after the impact. In an alternative exemplary embodiment, the axial extent of the section accommodated in the opening is smaller than or equal to the displacement distance.

The cage with a circumferential wall is preferably spaced laterally a distance away from the element. This prevents tilting of the element in the cage during displacement and thus ensures that the element will be shifted completely back into the opening, for example, in the case when the element protrudes with a section radially inward through the opening.

Assembly, disassembly and maintenance of the element and its holder can be simplified if the cage is detachably attached to a supporting section which surrounds the opening by a fastening section.

The ideal position of the element can be determined accurately if the element has a flange for contact with the supporting section in the axial direction of the element. The holder preferably attaches the element to the supporting section. In particular the element is pressed by the holder radially against the supporting section. Such a holder can also be implemented in a technically simple manner. Other holders are of course also conceivable such as, for example, locking rings which are inserted into circumferential grooves on the element and the supporting section and which release the element when the maximum load is exceeded.

In the case of a method according to the invention for absorption of an impact energy acting on an element from at least one blade fragment, where the element is inserted into an opening in a turbo-machine, which passes radially through a housing section in the region of a row of rotating blades, a first partial energy amount is absorbed by the element on impact of the at least one blade fragment, and when a predetermined maximum load is exceeded, a second partial energy amount is absorbed by a radial movement of the element outward and/or by running onto a rear limitation.

The method according to the invention guarantees preservation of the containment capability of the housing section and thus of the turbo-machine in the event of loss of a blade and/or loss of a blade fragment. A residual amount of energy is absorbed due to impact of the at least one blade fragment on a region of the housing section. The size of the energy input into the element depends on the ratio of the masses between the at least one blade fragment and the element, among other things. The lower the mass of the element in comparison with that of the at least one blade fragment, the lower is the amount of energy introduced into the element. The amount of energy introduced is reduced when friction losses are taken into account or when an impact having a plastifying component is assumed. An ideal elastic impact is the most conservative case. When a certain amount of energy introduced into the element falls below the expected threshold and/or when the maximum load on the holder is not reached, the load being adjustable through the mass ratios of the impact parameters, the impact no longer results in destruction of the holder.

Other advantageous exemplary embodiments of the invention are the subject matter of additional dependent claims. Preferred exemplary embodiments of the invention are explained in greater detail below with reference to a greatly simplified schematic diagram.

BRIEF DESCRIPTION OF THE DRAWING

FIG. 1 shows an exemplary embodiment of an apparatus according to the invention in a longitudinal section.

DETAILED DESCRIPTION OF THE DRAWING

In the following description of an exemplary apparatus 1 according to the invention, the directional term "radially" refers to the longitudinal axis of the machine and/or the rotor axis of a turbo-machine accommodating the apparatus 1. An element 2 of the apparatus 1, which is described in greater detail below, has a longitudinal axis running radially and/or orthogonally to the longitudinal axis of the machine.

An apparatus 1 according to the invention for absorbing the impact energy of a blade fragment or a blade of a row 4 of rotating blades of a turbo-machine acting on an element 2 is illustrated in FIG. 1. The rigid element 2 is a sensor or a probe, for example, for measuring the clearance between the row 4 of rotating blades and a housing section 6 which surrounds the row of rotating blades and radially borders a flow channel 8 of a primary flow in the region of the row 4 of rotating blades. Several of these apparatuses 1 are preferably provided, spaced a uniform distance apart from one another in the circumferential direction of the turbo-machine. The turbo-machine is preferably a gas turbine and in particular is an aircraft engine. The apparatus 1 is preferably arranged on the turbine end of the turbo-machine.

The element 2 is inserted into an opening 10 which passes radially through the housing section. It passes through the opening 10 and protrudes with a section 12 by an overhang and/or an immersion depth "a" into the flow channel 8. Toward the rear, the element 2 is in contact, with a flange 14, axially in the direction of its longitudinal axis with a supporting collar and/or supporting section 16 surrounding the opening 10. To prevent a substream of the primary flow from escaping from the flow channel 8 through the opening 10 along the element 2, the element 2 is accommodated in the opening 10 with a seal with a press fit, for example, contrary to the diagram.

To fasten the element 2 in its ideal position on the supporting collar 16, the apparatus 1 has a holder 18. The holder 18 in the exemplary embodiment shown here has two holding sections 20a, 20b which extend beyond the element 2 at the end and by means of which the flange 14 is pressed against the supporting collar 16. The holder 18 is of such dimensions that it opens on exceeding a maximum load that acts on the element 2 as a result of a blade fragment impact or blade impact, for example, due to shearing, thus releasing the element 2 for a radial displacement toward the outside. To set the maximum load precisely, the holder has at least one intended breaking point. The holder 18 thus secures the element 2 on the supporting section 16 up to a defined maximum load.

Furthermore, the apparatus 1 has a rear cage 22. The cage 22 is designed in a cup shape with a preferably cylindrical circumferential wall 24 and a round bottom wall 26 accordingly. The cage 22 defines a displacement space 28 for the element 2, which is closed for the external environment, for the element 2 after opening the holder 18, and thus, prevents loss of the element 2. The element 2 with its flange 14 is preferably at a distance from the circumferential wall 24. In this exemplary embodiment, the element 2 is preferably guided through the opening 10 and/or the supporting collar 16 of the opening 10 in displacement.

The cage 22 extends around the supporting collar 16 and is detachably attached to it, for example, by a screw connection between the supporting collar 16 and its circumferential wall 24 such that the supporting collar 16 is provided with an outside thread and the circumferential wall 24 is provided with a corresponding inside thread. A radial displacement distance "b" for the element 2 is defined by the distance between the flange 14 and the bottom wall 26. The bottom wall 26 acts as a displacement limitation for the element 2 after the displacement distance "b" has been bridged.

To permit the element 2 to be accommodated completely in the opening 2 on impact, the displacement distance "b" is larger than the immersion depth "a" of the element 2 into the flow channel 8, as in this exemplary embodiment, so it holds that a<b and preferably a<<b. To prevent the element 2 from leaving the opening 10 after an impact, the element 2 is accommodated in its ideal position with a section 30 in the opening 10, the extent "c" of this section in the direction of its longitudinal axis and/or in the axial direction of the element 2 being greater than the displacement distance "b" so it holds that c>b. The extent "c" is equal to an extent of the opening 10 in the radial direction. Due to the fact that the element 2 remains with a section in the opening 10 after the impact and the displacement, this also seals the flow channel 8 in the direction of the displacement space 28 after the impact. Furthermore, the mass relationships $m_2 << m_1$ also hold, where $m_2$ denotes the mass of the element 2 and $m_1$ denotes the mass of the blade fragment impacting and/or the impacting blade.

A preferred method according to the invention for absorption of the impact energy of at least one blade fragment acting on the element 2 is described below. The element 2 is inserted into the opening 10 and is situated in its ideal position, in which it is in contact with the supporting collar 16 with its flange 14 and protrudes by the immersion depth "a" into the flow channel 8 with a section 12. The element 2 is secured in its ideal position by the holder 18 acting on the element 2 at the rear and pressing the element 2 with its flange 14 against the supporting collar 16. The cage 22 is bolted onto the supporting collar 16, and thus, defines the displacement distance "b".

On impact, for example, of a blade on the element 2, the element undergoes plastic deformation, depending on its rigidity, and thus absorbs a first partial energy amount of the impact energy. When a preset maximum load has been exceeded, the holder 18 opens and releases the element 2. The element 2 performs a radial displacement toward the outside and runs onto the bottom wall 26 of the cage 22, depending on the remaining second partial energy amount, after passing by the displacement distance "b", so that the second partial energy amount is absorbed. The element 2 is then pushed completely into the opening 10 and secured against loss on the housing section 6 because of the cage 22. A residual amount of energy of the impact energy is absorbed by the region of the housing section 6 against which the rotating blade is thrown in sections onto the element 2 in addition to the impact. The housing section 6 per se is not damaged in the region of the opening 10 due to this multistage dissipation of energy, so that the housing section 6 retains its containment capability.

The course of the energy absorption can be determined in particular by the mass ratio $m_1$ to $m_2$, the rigidity of the element 2, the maximum load on the holder 18, the friction value of the element 2 in the opening 10, the friction value between the element 2 and the circumferential wall 24 of the cage 22 and the displacement distance "b".

An apparatus is disclosed for absorbing an impact energy of at least one blade fragment acting on an element, the element being inserted into an opening in a turbo-machine which opening passes radially through a housing section in the region of a row of rotating blades. The apparatus has a holder for holding the element in an ideal position and releasing the element on exceeding a preset maximum load and has a cage at the rear for securing the element during a displacement directed radially outward. A turbo-machine with such an apparatus and a method for a multistage energy absorption is also disclosed.

LIST OF REFERENCE NUMERALS 1 apparatus
2 element
4 row of rotating blades
6 housing section
8 flow channel
10 opening
12 section
14 flange
16 supporting section/supporting collar
18 holder
20a, 20b holding section
22 cage
24 circumferential wall
26 bottom wall
28 displacement space
30 section
a overhang/depth of immersion
b displacement distance
c length of an element section accommodated in the opening in the ideal position
$m_1$ impacting mass
$m_2$ mass of element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An apparatus for absorption of an impact energy acting on an element from a blade fragment, wherein the element is disposed through an opening in a turbo-machine, wherein the opening passes radially through a housing section in a region of a row of rotating blades, and wherein the element has a section that protrudes into a flow channel of the turbo-machine, comprising:
    a holder, wherein the holder holds the element in a position and releases the element when a preset maximum load acting on the element is exceeded; and
    a cage disposed at a rear of the apparatus, wherein the cage limits a radial displacement of the element and wherein the holder releases the element such that the released element runs onto a bottom wall of the cage;
    wherein the element is a sensor or a probe.

2. The apparatus according to claim 1, wherein the holder has an intended breaking point.

3. The apparatus according to claim 1, wherein the cage borders a displacement space which is closed toward an external environment.

4. A turbo-machine, comprising:
   an element, wherein the element is disposed through an opening that passes radially through a housing section of the turbo-machine in a region of a row of rotating blades, wherein the element has a section that protrudes into a flow channel of the turbo-machine, and wherein the element is a sensor or a probe;
   a holder, wherein the holder holds the element in a position and releases the element when a preset maximum load acting on the element is exceeded; and
   a cage, wherein the cage limits a radial displacement of the element and wherein the holder releases the element such that the released element runs onto a bottom wall of the cage.

5. The turbo-machine according to claim 4, wherein the element is displaceable in the cage by a radial distance which is larger than the section of the element that protrudes into the flow channel.

6. The turbo-machine according to claim 4, wherein the cage is disposed at a lateral distance from the element at a circumferential wall of the cage.

7. The turbo-machine according to claim 4, wherein the cage is detachably attached by a fastening section on a supporting section which surrounds the opening.

8. The turbo-machine according to claim 7, wherein the element has a flange which contacts the supporting section.

9. The turbo-machine according to claim 7, wherein the holder attaches the element on the supporting section.

10. A method for absorption of impact energy which acts on an element from a blade fragment, wherein the element is disposed through an opening in a turbo-machine, wherein the opening passes radially through a housing section in a region of a row of rotating blades, wherein the element has a section that protrudes into a flow channel of the turbo-machine, and wherein the element is held in a position by a holder, comprising the steps of:
   on impact of the blade fragment on the element, absorbing a first portion of the impact energy by the element; and
   releasing the element when a preset maximum load acting on the element is exceeded and absorbing a second portion of the impact energy by a radial movement of the element toward an outside and by running the element onto a limitation cage, wherein the cage limits the radial movement of the element and wherein the released element runs onto a bottom wall of the cage;
   wherein the element is a sensor or a probe.

* * * * *